G. H. E. DAVIS.
LIQUID COOLING APPARATUS.
APPLICATION FILED NOV. 11, 1919.
1,380,535.
Patented June 7, 1921.
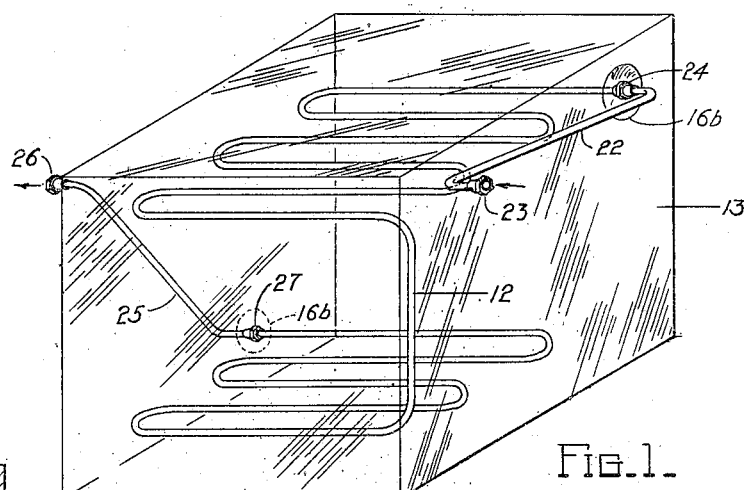
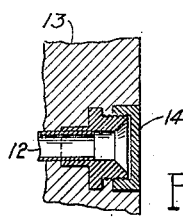
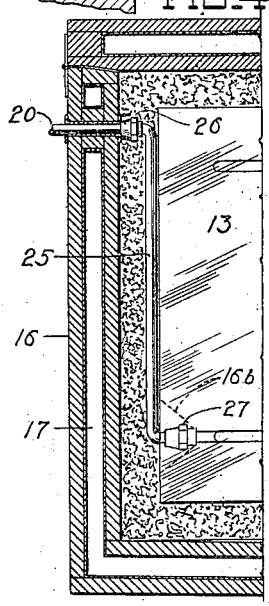
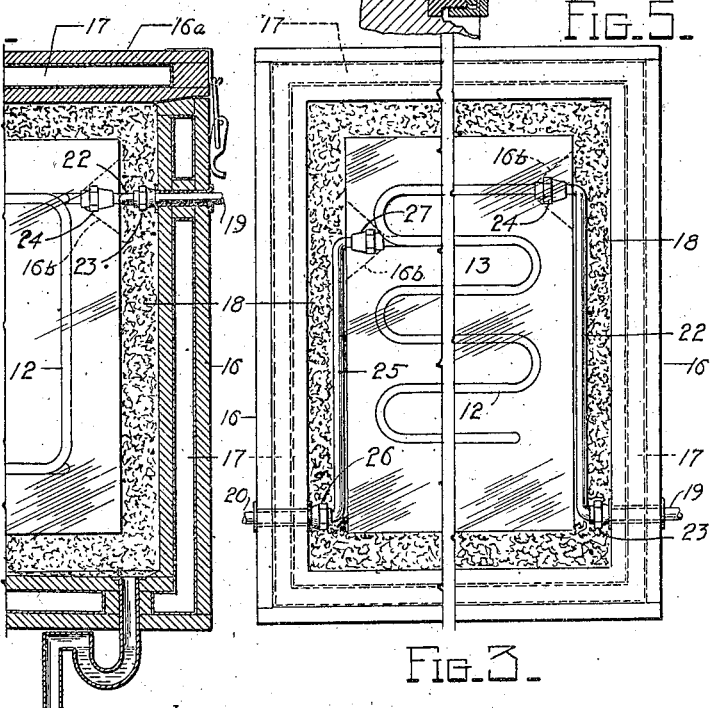
INVENTOR
GEORGE H E DAVIS
ATTYS.

UNITED STATES PATENT OFFICE.

GEORGE H. E. DAVIS, OF LYNN, MASSACHUSETTS.

LIQUID-COOLING APPARATUS.

1,380,535.  Specification of Letters Patent.  Patented June 7, 1921.

Application filed November 11, 1919. Serial No. 337,337.

*To all whom it may concern:*

Be it known that I, GEORGE H. E. DAVIS, a citizen of the United States, residing at Lynn, in the county of Essex and State of Massachusetts, have invented new and useful Improvements in Liquid-Cooling Apparatus, of which the following is a specification.

This invention as a whole is embodied in an element composed of an integral block of ice and a conduit associated therewith in such manner that the main portion of the conduit is incased in solid ice, so that liquid flowing through said conduit is cooled in its passage, and a heat-insulating case inclosing said element and protecting the ice against rapid melting, the case being provided with conduit members or portions detachably connected with the ends of the ice-incased conduit.

The invention includes the said element as an article of manufacture, the ends of the ice-incased conduit being adapted for detachable connection with the conduit members or portions associated with the case, so that when the apparatus is rendered inoperative by the melting of the ice, it may be reorganized by installing another of said elements in the case.

Of the accompanying drawings forming a part of this specification,—

Figure 1 is an isometrical view of a cooling element including an integral block of ice and a conduit incased therein.

Fig. 2 is a view showing the case in vertical section and the cooling element in end elevation.

Fig. 3 is a top plan view, the cover of the case being removed.

Fig. 4 is a fragmentary sectional view, showing a portion of the cooling element as originally formed.

Fig. 5 is a view similar to Fig. 4, showing the cooling element conduit connected with a conduit extension.

The same reference characters indicate the same parts in all of the figures.

In the drawings, 12 represents a sinuous conduit member preferably composed of a metal tube disposed in a plurality of return bends which are so arranged and proportioned that the main portion of the conduit member, including said bends, may be incased in an integral block 13 of ice, said main portion being entirely within and spaced from the surfaces of the block. The conduit member may be suspended in any suitable way in a receptacle or block-forming mold containing water, the water being then congealed to form the block 13. Each end portion of the conduit member 12 may be temporarily closed by a cap 14, as shown by Fig. 4, to exclude water.

Each end portion of the conduit member is provided with an externally screw threaded collar, or otherwise equipped with a coupling part adapted for detachable connection with a terminal conduit member, said coupling part being rendered accessible from the exterior of the block, by cutting the block to form a recess $16^b$, as shown by Fig. 5.

The block 13 and conduit member 12 constitute a portable cooling element which may be marketed as an article of manufacture, and used by the purchaser in organizing a cooling apparatus, which includes a heat-insulating case 16, formed to receive the said element. Said case may be formed as a box having an open top in which the cooling element is insertible, and a movable cover $16^a$ formed to close said top.

The walls of the box and the cover may be provided with hermetically closed chambers or spaces 17 from which air is exhausted. The interior of the box and the exterior of the block 13 are preferably formed to provide a space surrounding the block for the reception of a packing 18 of sawdust, or other suitable material, entirely surrounding the cooling element.

Through portions of the box extend terminal conduit members 19 and 20, the member 19 being suitably connected with a source of liquid supply, and the member 20 with a dispensing member such as a faucet. The said terminal conduit members include portions within the box having coupling parts, adapted for detachable connection with the coupling parts at the opposite ends of the ice-incased conduit member 12, the latter being an intermediate conduit member. As here shown, the terminal conduit members include a conduit portion 22 detachably connected by a coupling 23 with the portion 19, and by a union 24 with the intake end of the intermediate conduit 12, and a conduit portion 25, detachably connected by a union 26 with the portion 20, and by a union 27 with the discharge end of the intermediate conduit 12.

It will now be seen that a liquid-conducting and cooling apparatus may be organized by inserting the cooling element in the case, and connecting the ice-incased intermediate conduit member 12 with the terminal conduit members 19 and 20. The ice in the form of a solid integral block protected by the case, will last much longer than a filling of broken ice packed in the case around the conduit 12.

When the ice is melted, or becomes inoperative by melting, the apparatus may be reorganized by inserting a new cooling element in the case.

The conduit 12 may be returned by the consumer to the manufacturer after the ice has been consumed.

The block 13 constitutes a cooling unit having surface portions interposed between the intermediate conduit 12 and the internal surfaces of the box, so that practically all portions of the intermediate conduit are incased in solid ice. The surface portions of the block conform to the internal surfaces of the box, and are preferably separated from said internal surfaces by a space surrounding the block and containing the packing 18, the latter contacting with the block and minimizing the surface melting thereof.

I claim:

1. A liquid-cooling apparatus comprising a heat-insulating box, adapted to be opened and to be closed practically air tight, terminal conduit members passing through, and supported by portions of the box, and provided within the box with coupling parts, and a portable cooling element formed for insertion in the box when the latter is opened, and insulated from external heat by the closing of the box, said element including an intermediate sinuous conduit member, provided at its ends with coupling parts complemental to, and coinciding with, the coupling parts on the said terminal members, and a block of ice incasing and contacting with the said intermediate conduit member between its coupling parts, the latter being exposed at the exterior of the block, so that the intermediate conduit member may be detachably secured to the terminal conduit members, after the insertion of the said portable element in the box, the said block constituting a cooling unit having surface portions interposed between the intermediate conduit and the internal surfaces of the box.

2. A liquid cooling apparatus substantially as specified by claim 1, the surfaces of the said block being spaced from the walls of the box, and the apparatus including packing material filling the space between the walls of the box and the surfaces of the block.

3. A portable element of liquid cooling apparatus, comprising a sinuous conduit member provided at its ends with coupling parts for detachable connection with fixed conduit members, and a block of ice incasing and contacting with the sinuous conduit member between said coupling parts, the latter being exposed at the exterior of the block, the said block constituting a cooling unit having surface portions outside the sinuous conduit member, and formed to permit the insertion of the portable element in a heat-insulating box.

In testimony whereof I have affixed my signature.

GEORGE H. E. DAVIS.